United States Patent Office 3,247,650
Patented Apr. 26, 1966

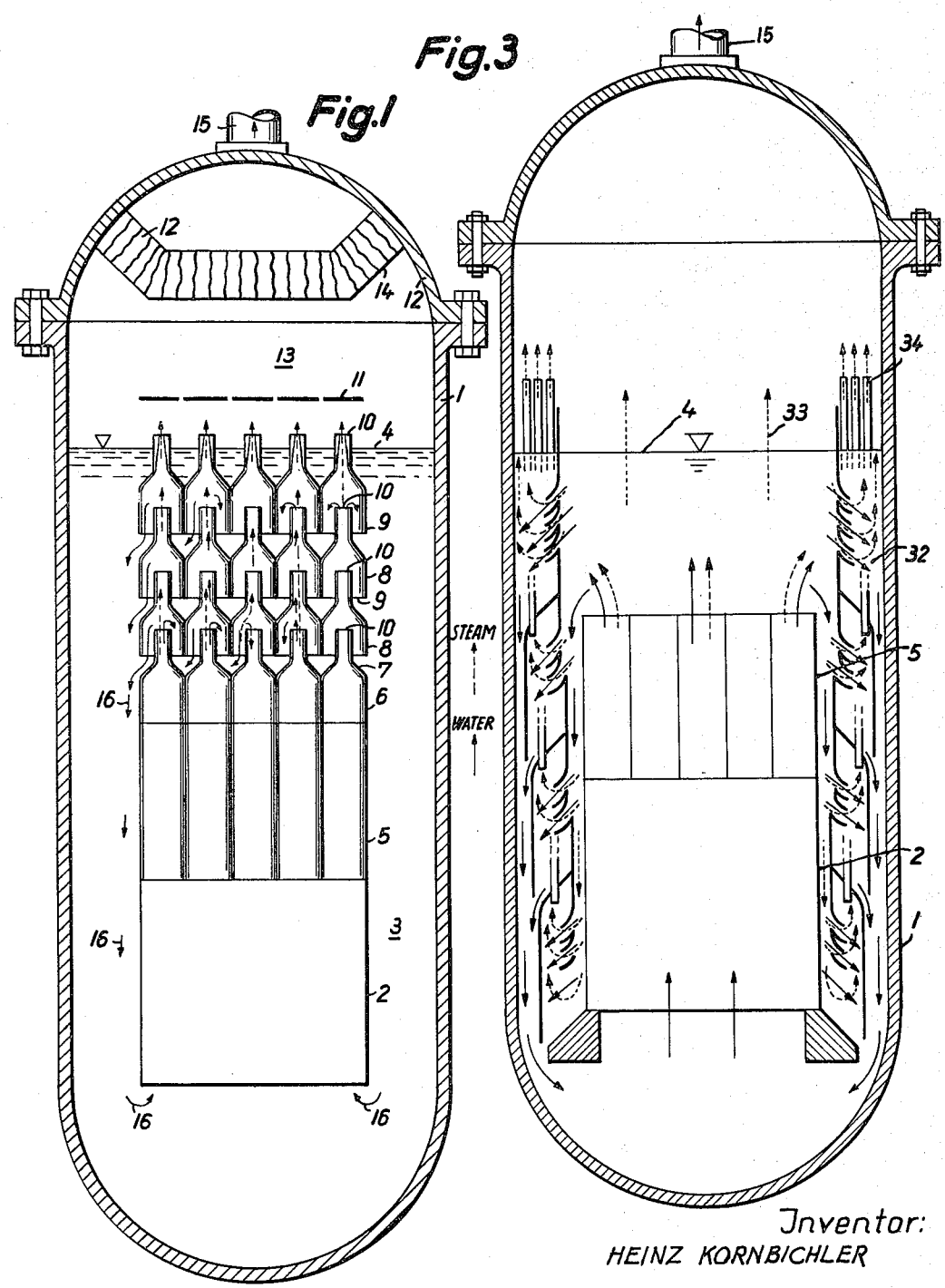

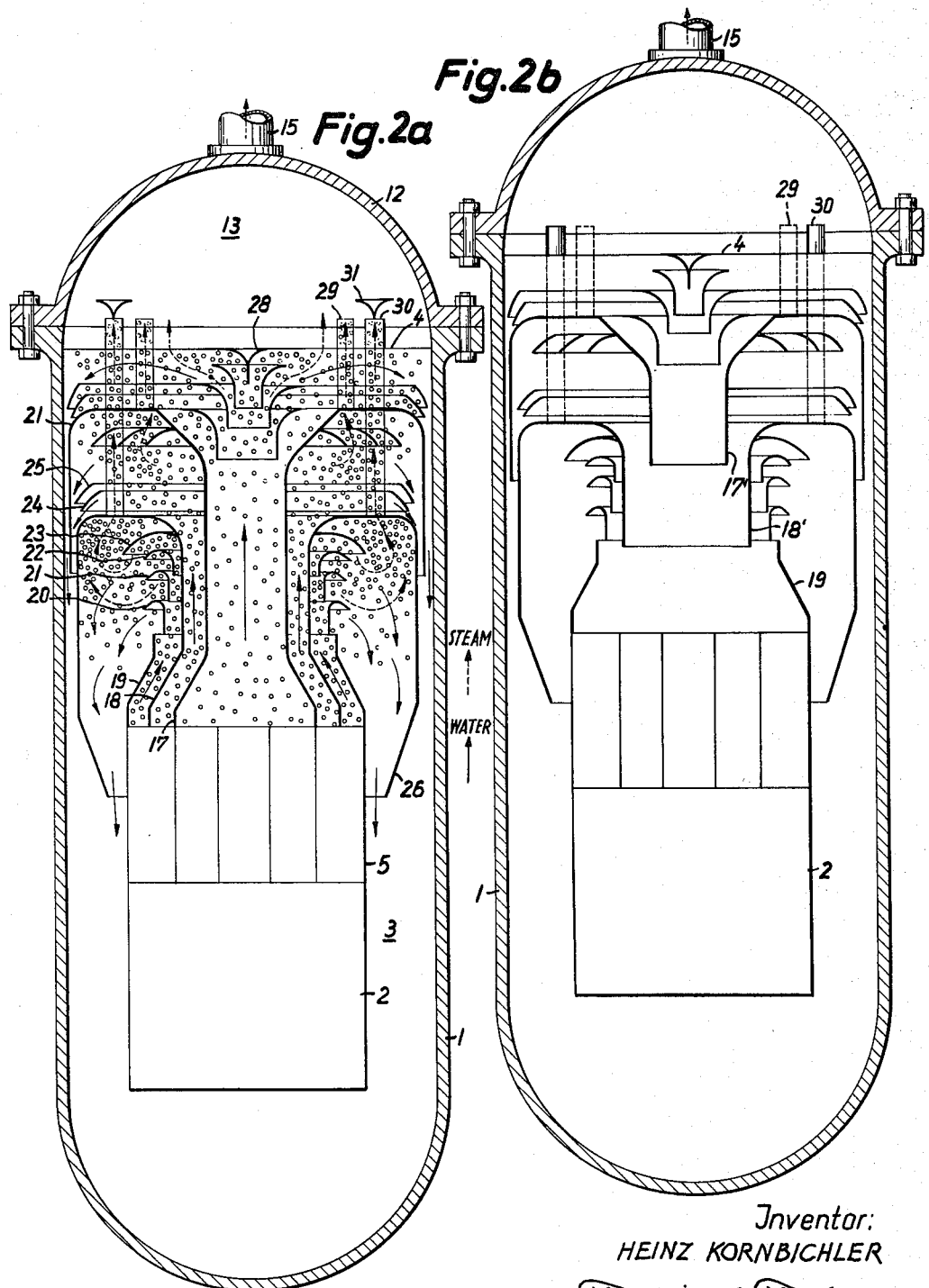

3,247,650
APPARATUS FOR SEPARATING A WATER AND STEAM MIXTURE
Heinz Kornbichler, Walldorf, near Frankfurt am Main, Germany, assignor to Licentia Patent-Verwaltungs-G.m.b.H., Frankfurt am Main, Germany
Filed June 18, 1962, Ser. No. 203,384
2 Claims. (Cl. 55—185)

The present invention relates to an arrangement for separating steam and water from a mixture of steam and water produced by a steam generator, more particularly, to such a separating arrangement for use in the pressure tank of a boiling water reactor.

In a boiling water reactor water is circulated through a nuclear reactor which, upon heating the water, produces a mixture of steam and water. The steam is then separated from the mixture of steam and water in as dry a condition as possible and tapped from the head of the pressure tank for use. The water which is preferably free from all steam bubbles is then circulated downwardly outside of the nuclear reactor core to be passed in heat exchange relationship again therewith.

If the steam, which is tapped from the pressure tank, has water particles entrained therein, these particles would be destructive of the turbine blades in the event the steam was used to power a turbine. In addition, such steam having water particles entrained therein would cause operating difficulties in a superheater by slowing down the action thereof.

In addition, if the steam is not completely separated from the water which is recirculated through the nuclear reactor, these steam bubbles would be taken down to the lower end of the reactor core and at least they would partially take away the subcooling of the water at the lower end of the reactor core, achieved by feeding subcooled feedwater to the reactor, and thus would impair the operation of the nuclear reactor.

In small capacity boiling water reactors, or in boiling water reactors operating under a not too high load, desired separation of steam and water occurs satisfactorily due to the action of gravity upon the mixture of steam and water. This separation occurs because there is sufficient time between the drain of the steam and water mixture from the nuclear reactor and the drain of the separated components. However, when the specific capacity of a boiling water reactor is increased, especially at an increase of the effective capacity, a point will be reached at which this separation of steam and water will not occur unless additional measures are taken.

In order to obtain the desired separation in such reactors, it has been proposed to increase the time available for carrying out this separation by increasing the area of the water surface in the pressure tank. This will decrease the speed at which the mixture of steam and water flows from the nuclear reactor and this will provide additional time for the separation of the steam and water by gravity. This solution, however, has the disadvantage that the pressure vessel must be considerably enlarged and as a result the construction costs are greatly increased. Further, in large boiling water reactors the area of the water level is limited on account of the possible maximum dimensions of the pressure tanks which can be produced.

It has also been proposed to construct mechanical separators in the pressure tanks wherein the difference in the centrifugal forces between the water and steam is employed for carrying out the separation operation. These mechanical separators have generally been cyclone or centrifugal separators. However, this method of separation has the disadvantage that, as a result of the acceleration of the mixture of steam and water through the separator, there is a tendency for the average diameter of the steam bubbles to decrease and thus there is a finer division of the steam in the water. This tendency increases the difficulty of the separation so that considerably greater accelerations and larger pressure drops in the separators are required in order to perform a successful separation. Where forced circulation of the water is employed, the pressure drop in such separators is disadvantageous because it is then necessary to increase the head of the pumps. If there is a natural circulation of the water, this pressure drop may be so high that no successful operation of the reactor is possible.

It is therefore the principal object of the present invention to provide a novel and improved arrangement for the separation of steam and water in the pressure tank of a boiling water reactor.

It is another object of the present invention to provide a mechanical separator for separating the steam and water produced in a boiling water reactor wherein the mixture of steam and water is subjected to only a slight pressure drop during the separation operation.

It is an additional object of the present invention to provide a mechanical arrangement for the separation of a steam and water mixture in a boiling water reactor which incorporates the advantages of natural separation.

Other objects and advantages of the present invention will be apparent upon reference to the accompanying description when taken in conjunction with the following drawings, wherein FIGURE 1 is a vertical sectional view through the pressure tank of a boiling water reactor and the separating arrangement therein constituting the present invention with the arrangement being shown schematically;

FIGURES 2a and 2b are views similar to that of FIGURE 1 but show a modification of the separator arrangement with FIGURE 2a showing the flow of the steam and water and FIGURE 2b showing schematically the arrangement of the baffle structure; and FIGURE 3 is a view similar to that of FIGURE 2a or 2b and showing a further modification of a separating arrangement.

With reference to the accompanying drawings a specific embodiment and several modifications of the present invention will be described in detail, with like reference symbols indicating the same parts throughout the various views of the several drawings.

With reference to FIGURE 1, the boiling water reactor comprises a pressure tank or chamber 1 which is surrounded by shielding constructed in a conventional and well-known manner to absorb radioactive radiation from the nuclear reactor.

Mounted within the pressure tank 1 is a nuclear reactor core generally indicated at 2. The nuclear reactor core 2 has disposed therein fissionable materials such as, for example, in the form of zirconium-coated uranium dioxide pellets. Neutron density within the reactor core 2 is regulated and monitored by conventional and well-known means not shown in the drawings.

The nuclear reactor core 2 is submerged in water 3 which is contained within the pressure tank 1 to a level indicated at 4.

A plurality of vertically extending chimneys 5 are mounted above the reactor core 2 carrying off the mixture of water and steam produced within the nuclear reactor core 2 and flowing upwardly therefrom into a plurality of tubular members 6. The upper ends of the tubular members 6 are reduced in cross-section as indicated at 7. Positioned above each tubular member 6 is a vertically spaced plurality of tubular sections 8 each having a lower end 9 of a larger cross-sectional area than the upper ends 10 of the vertical tubular members 6.

The upper ends 10 of the tubular sections 8 are of reduced cross-sectional area. The larger lower ends of the tubular sections 9 are positioned over the reduced area upper ends 10 of the next-lower tubular sections or vertical tubular members.

Baffle plates 11 are positioned above the upper ends of the uppermost layer of tubular sections to remove any residual water entrained in the steam rising from the separator arrangement.

The top of the pressure tank 1 is closed by an upper lid 12 which is substantially dome-shaped. A drying structure of a conventional and known type is positioned at 14 in the steam chamber 13 so as to dry the steam before it is discharged through the outlet 15 to either a superheater or some structure for utilizing the energy thereof.

In the operation of the separator arrangement the mixture of heated water and steam produced by the nuclear reactor core 2 will rise since the density of this mixture is lower than that of the colder water. The mixture of water and steam rises upwardly and passes through the chimneys 5 and the following tubular members 6. The stream in each member is then successively passed through the reduced areas of the separator arrangement where the velocity of the stream is greatly increased, and then through a part of the larger area portions of the separating arrangement wherein the velocities thereof are decreased. It is known that the vapor content of such a stream of water and steam is greater in the center of the stream than it is at the outer edges thereof. Accordingly, a portion of the outer partial stream possessing a smaller concentration of vapor bubbles than the center stream flows horizontally outwardly around the upper ends 10 of the tubular members 6. This portion of the partial stream which is deflected laterally outwardly of the separator arrangement and downwardly has such a low velocity that the steam bubbles therein have sufficient time to rise within the water stream before the stream passes the lower ends 9. The proper velocity is reached by decreasing the upper ends 10 from one layer to the next one, so that the rising steam-water-mixture has to pass points with increasing flow-resistance. This resistance forces the outer layers of the stream with the proper velocity to the lower ends 9 as mentioned above.

Because of the generally bell-shaped structure of the tubular sections 8, the rising steam bubbles of the laterally deflected stream are again introduced into the rising mixture of steam and water whereas the separated water of the deflected stream is flowing downwardly and conducted into the space laterally of the separator arrangement and circulates downwardly, as indicated by the arrows 16, and then recirculated through the nuclear reactor core 2.

By providing a series of tubular sections such as illustrated in FIGURE 1, it is possible to separate a considerable portion of the water from the steam and water mixture without essentially disturbing the natural circulation of the water in the pressure tank by effecting a very low pressure loss in the mixture of water and steam flowing through the separator arrangement. The steam which emerges from the upper ends of the uppermost tubular sections and from the surface of the water level 4 may be passed through a further baffle arrangement 11 to remove the residual water therefrom. The steam is then dried at 14 and discharged through 15.

The separator arrangement is constructed to successively throttle the partial streams of water and steam and also enables a substantially horizontal flow of portions of the water and steam mixture. This throttling of the mixture together with the horizontal flow thereof establishes most favorable conditions for the separation of the steam from the water.

While the above embodiment has been described as utilizing a nuclear reactor for heating the water to produce a mixture of steam and water, it is to be understood that other forms of steam generators could be substituted for this nuclear reactor. Hence, this separator arrangement of the present invention is not limited to use with nuclear reactors.

Proceeding next to FIGURES 2a and 2b, wherein a modification of the separator arrangement is schematically illustrated, there is mounted above the chimneys 5 a plurality of concentric tubular members 17, 18 and 19. These tubular members are reduced in area and the upper ends thereof extend to various levels. A plurality of curved deflecting plates 20, 21, 22 and 23 are positioned above the upper end of the outer tubular member 19. The plates 20 thorugh 23 have varying diameters and extend outwardly for different distances.

A plurality of curved deflecting plates 24 and 25 are positioned at the upper end of the tubular member 17. In addition, the tubular member 18 is provided at its upper end with a cylindrical extension which has a reduced area portion 26 at its lower end.

There is a similar extension on the upper end of the tubular member 17 indicated at 27. Positioned within the upper end of the tubular member 17, which is flared outwardly, are several various-diameter cylindrical deflecting elements indicated at 28.

Vertical discharge tubes 29 and 30 are arranged in the deflecting structure and extend to different levels thereof. These discharge tubes permit the rise and escape of steam separated from the steam and water mixture in various levels of the deflecting arrangement. The upper ends of the vertical discharge tubes may be provided with further baffle plates 31 to centrifuge any residual water entrained in the steam discharged therethrough.

The operation of the modification of FIGURE 2a is basically similar to that of the structure described in FIGURE 1. The mixture of water and steam produced by the molecular reactor core 2 and flowing upwardly through the chimneys 5 is further separated into a plurality of concentric streams. These concentric streams are then again separated by the baffles which deflect the streams outwardly into the cylindrical extensions, so that the steam bubbles have time to rise upwardly through the vertical discharge pipes 29 and 30. The water then flows downwardly outside of the nuclear reactor core to be circulated upwardly therethrough.

The separator arrangement of FIGURE 2b is similar to that of FIGURE 2a except that the lower ends of the concentric tubes 17', 18' and 19 are at different levels of the separator arrangement.

The modification of FIGURE 3 is particularly adapted for use in a boiling water reactor wherein the water is naturally circulated through the reactor. In this modification the separator arrangement indicated generally at 32 is positioned laterally of the nuclear reactor core 2 and the vertically extending chimneys 5. Some of the steam will be naturally separated from the mixture of steam and water and will escape upwardly as indicated by the arrows 33. The remaining steam will be entrained in the water circulating downwardly laterally of the reactor core and this steam is separated in the separator arrangement 32. This separator arrangement also comprises a plurality of stages of deflecting baffles which successively cause a partial stream of mixture of steam and water to reduce its velocity and allows the natural separation of steam and water. In order to provide for the discharge of steam separated from the mixture, a plurality of vertical discharge tubes 34 is provided whose lower ends extend to various levels of the separator arrangement 32. The discharge tubes 34 comprise radially spaced groups of tubes being spaced circumferentially above the reactor core.

The modifications of the present invention may be provided with suitable restrictors at various places therein in order to obtain the necessary velocity of flow for the water flowing off from the various separating channels in order to prevent this water from carrying along vapor bubbles therewith at increased velocities.

Thus it can be seen that the present invention provides a simple effective mechanical separating system for separating a steam and water mixture produced by a steam generator. This separator arrangement of the present invention has the main advantage of a natural separation, namely, a small loss in pressure, and avoids the disadvantage of a natural separation, namely, poor functioning at high loads. In order to incorporate this invention it is often not necessary to increase the diameter and height of the pressure tank.

It will be understood that this invention is susceptible to modification in order to adapt it to different usuages and conditions, and, accordingly, it is desired to comprehend such modifications within this invention as may fall within the scope of the appended claims.

What is claimed is:

1. An arrangement for separating steam and water from a steam-liquid mixture passing from below through the open liquid surface in a pressure tank comprising: a pressure tank containing a body of liquid having a surface, a compartment in said tank, a plurality of integral chimneys extending upwardly from the compartment delivering an upwardly directed stream of a steam-liquid mixture in said pressure tank beneath said surface, each of said chimneys connected to a tubular member having an inwardly tapered intermediate portion and a restricted upper neck portion, like bell-shaped tubular elements thereabove, each neck portion extending into the lower end of a corresponding like bell-shaped tubular element thereabove, said tubular elements constituting the lower tier of at least three tiers of spaced like tubular elements, each of said elements having a relatively wide lower entrance end and a relatively narrow neck-like upper outlet end, the said tubular elements of each tier being so constructed and arranged that the tubular element of one tier except the topmost tier projects into the corresponding wide lower entrance end of a tubular element thereabove, means for maintaining the surface of said liquid below the upper ends of the elements of the topmost tier and above the lower ends thereof, and baffles positioned above and in line with the outlet ends of the elements of the said topmost tier.

2. The invention as defined in claim 1, said compartment, chimneys and tubular members being centrally positioned within said tank in lateral spaced relation, with the walls of said tank and thereby providing passageways for downwardly circulating streams of liquid.

References Cited by the Examiner

UNITED STATES PATENTS

| | | | |
|---|---|---|---|
| 66,370 | 7/1867 | Matthiessen | 122—34 X |
| 277,457 | 5/1883 | Cambell. | |
| 434,972 | 8/1890 | Baird | 122—34 |
| 466,657 | 1/1892 | Cromwell. | |
| 1,067,010 | 7/1913 | Dunn | 122—34 X |
| 2,771,281 | 11/1956 | Otto | 55—442 |
| 3,041,264 | 6/1962 | Ricard | 176—54 |
| 3,063,925 | 11/1962 | Huet. | |
| 3,086,343 | 4/1963 | Stern | 210—512 |

OTHER REFERENCES

Wilson et al.: "Removal of Entrained Moisture From Steam Using Natural Separation and Mechanical Dryers," AEC report ACNP–6105, copy available from Office of Technical Services, Department of Commerce, Washington 25, D.C. Price $1.25. The whole report is cited as a reference (46 pages), but pages 2 and 3 are particularly relied upon.

REUBEN FRIEDMAN, *Primary Examiner.*

NORMAN YUDKOFF, REUBEN EPSTEIN, *Examiners.*